(12) United States Patent
O'Neall et al.

(10) Patent No.: US 10,176,303 B1
(45) Date of Patent: Jan. 8, 2019

(54) EFFICIENT MANAGEMENT, CONTROL, AND EVALUATION OF CAPTURED DIGITAL MEDIA

(71) Applicant: LINX SYSTEMS, INC., Downs, IL (US)

(72) Inventors: Andrew O'Neall, Bloomington, IL (US); Donald O'Neall, Bloomington, IL (US)

(73) Assignee: Linx Systems, Inc., Downs, IL (US)

( * ) Notice: Subject to any disclaimer, the term of this patent is extended or adjusted under 35 U.S.C. 154(b) by 246 days.

(21) Appl. No.: 14/820,352

(22) Filed: Aug. 6, 2015

Related U.S. Application Data

(60) Provisional application No. 62/103,867, filed on Jan. 15, 2015.

(51) Int. Cl.
| | | |
|---|---|---|
| *G06F 7/04* | (2006.01) | |
| *G06F 21/10* | (2013.01) | |
| *G06F 21/62* | (2013.01) | |
| *H04L 29/06* | (2006.01) | |

(52) U.S. Cl.
CPC .......... *G06F 21/10* (2013.01); *G06F 21/6218* (2013.01); *H04L 63/102* (2013.01)

(58) Field of Classification Search
CPC ...... G06F 21/10; G06F 21/31; G06F 21/6218; H04L 63/10; H04L 63/102
See application file for complete search history.

(56) References Cited

U.S. PATENT DOCUMENTS

| | | | | |
|---|---|---|---|---|
| 7,098,931 | B2 * | 8/2006 | Patterson | G01C 11/00 345/634 |
| 2007/0079121 | A1 * | 4/2007 | Sekiguchi | G01C 21/26 713/168 |
| 2008/0066194 | A1 * | 3/2008 | Ketola | H04L 63/10 726/33 |
| 2009/0106087 | A1 * | 4/2009 | Konar | G06Q 30/02 705/14.71 |
| 2012/0030237 | A1 * | 2/2012 | Tanaka | G06F 17/3028 707/770 |
| 2013/0211971 | A1 * | 8/2013 | Lin | G06F 21/10 705/27.1 |
| 2014/0283023 | A1 * | 9/2014 | Flavin | G06F 21/6263 726/21 |
| 2015/0304392 | A1 * | 10/2015 | Chen | H04L 67/06 709/203 |

* cited by examiner

*Primary Examiner* — Hadi S Armouche
*Assistant Examiner* — Shaqueal D Wade
(74) *Attorney, Agent, or Firm* — Elliot H. Karlin; Hickman Palermo Becker Bingham LLP

(57) ABSTRACT

A computer-implemented method for generating digital media tasks, authorizing digital media associated with the digital media tasks, and evaluating the digital media is provided. In an embodiment, a server computer creates a digital media task and sends it to one or more mobile computing devices. When the server receives digital media from a mobile computing device, the server computer determines whether it is authorized to provide other computing devices with access to the digital media. Determining whether the server computer is authorized to provide other computing devices with access to the digital media may comprise determining whether the server computer has current waivers for the digital media or whether supervisory computing device has provided authorization.

18 Claims, 13 Drawing Sheets

Create Task

Name: Demo Task — 302

Description:
Task Instructions:
1. Take Side by Side Photo
2. Upload Photo
3. Wait for approval
— 304

Tags: photo x  task x  demo x — 306

Due Date: 2015-03-30 — 308

Assignee: Calvin Coolidge, Warren Harding, Teddy — 310

Overlay: Side by Side Photo with Caption — 312

Caption A: Caption A
Caption B: Caption B

Preview: 314

EFFICIENT MANAGEMENT, CONTROL, AND EVALUATION OF CAPTURED DIGITAL MEDIA

BENEFIT CLAIM

This application claims the benefit under 35 U.S.C. § 119(e) of provisional application 62/103,867, filed Jan. 15, 2015, the entire contents of which is hereby incorporated by reference for all purposes as if fully set forth herein.

FIELD OF THE DISCLOSURE

The present disclosure relates to computer-implemented techniques for the generation and management of digital media tasks. More specifically, the disclosure relates to the creation, assignment, and evaluation of task objects that are associated with requests for digital media such as images that may be captured by mobile computing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Capture of media on mobile devices has become extremely widespread. In the consumer realm, a multitude of photographs and video clips are created every day and shared with the public. As people become more influenced by photographs companies, such as those that deal in agriculture, automotive vehicles, construction, energy, pharmaceuticals, retail, and other consumer focused markets, have started gathering more digital media for use in advertising, webpages, training, and other private and public offerings.

While media capture has been simplified on mobile devices, control of the captured media is more difficult. Many consumer outlets have removal provisions in case uploaded media is deemed inappropriate or the subject of legal complaints. While such a system functions well in the consumer realm, businesses need to have greater control over media that is shared both internally and externally. For example, many businesses that require image capture operations as part of their regular business processes would prefer to have a system in place that removes inappropriate media before it is shared with other employees. Additionally, a business may want to ensure that it has the rights to use digital media before the media is displayed to the public. Therefore, for businesses with employees who capture images on a regular basis as part of their operations, there is a need for greater supervisory control of digital media files and for verifying whether a business has the legal right to use the digital media files.

An additional issue with the prevalence of digital media is the difficulty in ensuring that a quality product is produced. This issue rarely exists in the consumer realm where digital media is captured for personal use. In the business realm, a business may desire an efficient way of ensuring that it receives quality digital media. For example, if an agriculture employee is tasked with capturing images of a field to enable an agribusiness to evaluate field conditions, then the employer may wish to be able to view and evaluate the images before the employee leaves the field. If the images do not conform to company standards, the employer may wish the employee to capture more images before the employee leaves the field. As another example, a business may have strict requirements for the use and placement of the business logo in a photograph or video. The placement of the logo may become a problem if the captured digital media contains important or useful information in an area of the media that is reserved for the placement of the logo. These difficulties are compounded when a large number of employees are tasked with capturing a large number of images. Thus, there is a need for a method for efficient and effective management and evaluation of captured digital media.

BRIEF DESCRIPTION OF THE DRAWINGS

In the drawings:

FIG. 3B depicts an example task creation interface with a side by side photo with caption overlay that may be displayed by computer on a computer display device.

FIG. 9 depicts an example waiver interface that may be displayed by computer on a computer display device.

DETAILED DESCRIPTION

Figure 1:
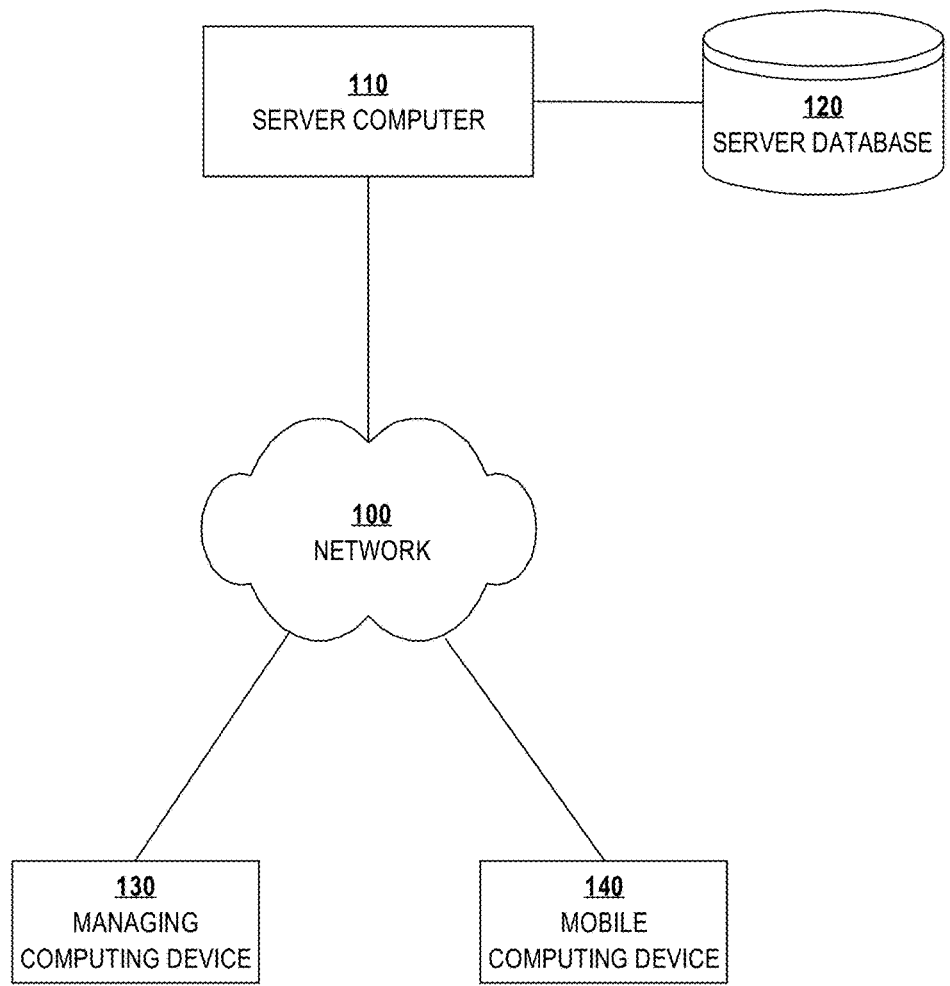
FIG. 1 is a technical diagram of example components of a media task management system.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

General Overview

Aspects of the disclosure generally relate to computer-implemented techniques for generating, assigning, and storing digital media tasks. Aspects of the disclosure also relate to computer-implemented techniques for controlling, authorizing, and evaluating digital media in relation to the digital media tasks. In an embodiment, a task object is created that defines requested pieces of digital media and one or more assignees of a task. The task object is then sent to one or more mobile computing devices associated with the one or more assignees.

When one of the one or more mobile computing devices attempts to upload digital media to satisfy the task, the server computer determines whether it has authorization to send the task to other computing devices. If the server computer determines that it has the authorization, the digital media is sent to other computing devices. In some embodiments, determining whether the server computer has authorization comprises determining whether the task assignee or one or more subjects of the digital media have signed a current waiver. In some embodiments, determining whether the server computer has authorization comprises sending the digital media and a request for authorization to a supervisory computing device.

In an embodiment, a mobile computing device receives one or more digital media tasks. The mobile computing device displays the one or more digital media tasks to a user. The mobile computing device receives a selection of one of the tasks. The mobile computing device may determine that an overlay has been associated with the selected task. The mobile computing device may display the overlay on a capture preview screen. When the mobile computing device receives input requesting a capture of the digital media, the captured digital media may be combined with the overlay. The combined image may then be sent to a server computer to complete the digital media task.

In an embodiment, a method comprises using a server computer, creating a task object that identifies a digital media task and causing the task object to be stored in a data repository, wherein the digital media task identifies one or more users and one or more requests for digital media; receiving, from a mobile computing device associated with a particular user of the one or more users, an item of digital media in response to the one or more requests for digital media; determining that the server computer has authorization to provide one or more target computing devices with access to the item of digital media, and in response to the determining, storing the item of digital media in the data repository with the task objects; displaying the one or more items of digital media to the one or more target computing devices in association with the task object; wherein the method is performed by one or more computing devices.

In an embodiment, receiving, over a network at a mobile computing device comprising a digital camera, one or more digital media tasks associated with one or more task objects that are stored in a data repository at a server computer; displaying the one or more digital media tasks on the mobile computing device; receiving a selection of a particular digital media task of the one or more digital media tasks; wherein the particular digital media task identifies one or more items of digital media that are to be obtained to complete the particular digital media task; determining that one or more digital media overlays are associated with the particular task, wherein the one or more digital media overlays comprise one or more images, audio recordings and/or videos configured to provide a foreground layer when combined with the one or more items of digital media; displaying a media capture preview on the mobile computing device with the one or more digital media overlays; capturing a particular item of digital media on the mobile computing device; combining the particular item of digital media with the one or more digital overlays to create a combined item of digital media; sending, over the network, the combined item of digital media to the server computer; wherein the method is performed by one or more computing devices.

Structural Overview

FIG. 1 is a technical diagram of example components of a media task management system.

In an embodiment, server computer 110, managing computing device 130, and mobile computing device 140 are communicatively coupled over network 100. Server computer 110 may contain server database 120.

Server computer 110 may be configured or programmed to interact with managing computing device 130 and mobile computing device 140. In an embodiment, server computer 110 is an application server that interacts with managing computing device 130 and mobile computing device 140 through a software application executing on device 130 and device 140. In an alternate embodiment, server computer 110 interacts with mobile computing device 140 through a separate application server. Server computer 110 may be further configured to provide managing interfaces and mobile interfaces for task creation, display, selection, completion, authorization, and evaluation. Server computer 110 may store created tasks, digital media, overlays, and waiver data in server database 120.

Managing computing device 130 may be a general purpose computing device that is configured or programmed to display interfaces for creating tasks, viewing tasks, evaluating and authorizing media associated with tasks, and reviewing waiver data. Mobile computing device 140 may be a cell phone, tablet, PDA, or any other mobile computing device. Mobile computing device 140 may be configured to display task objects stored in server database 120.

Task Creation

Figure 2:
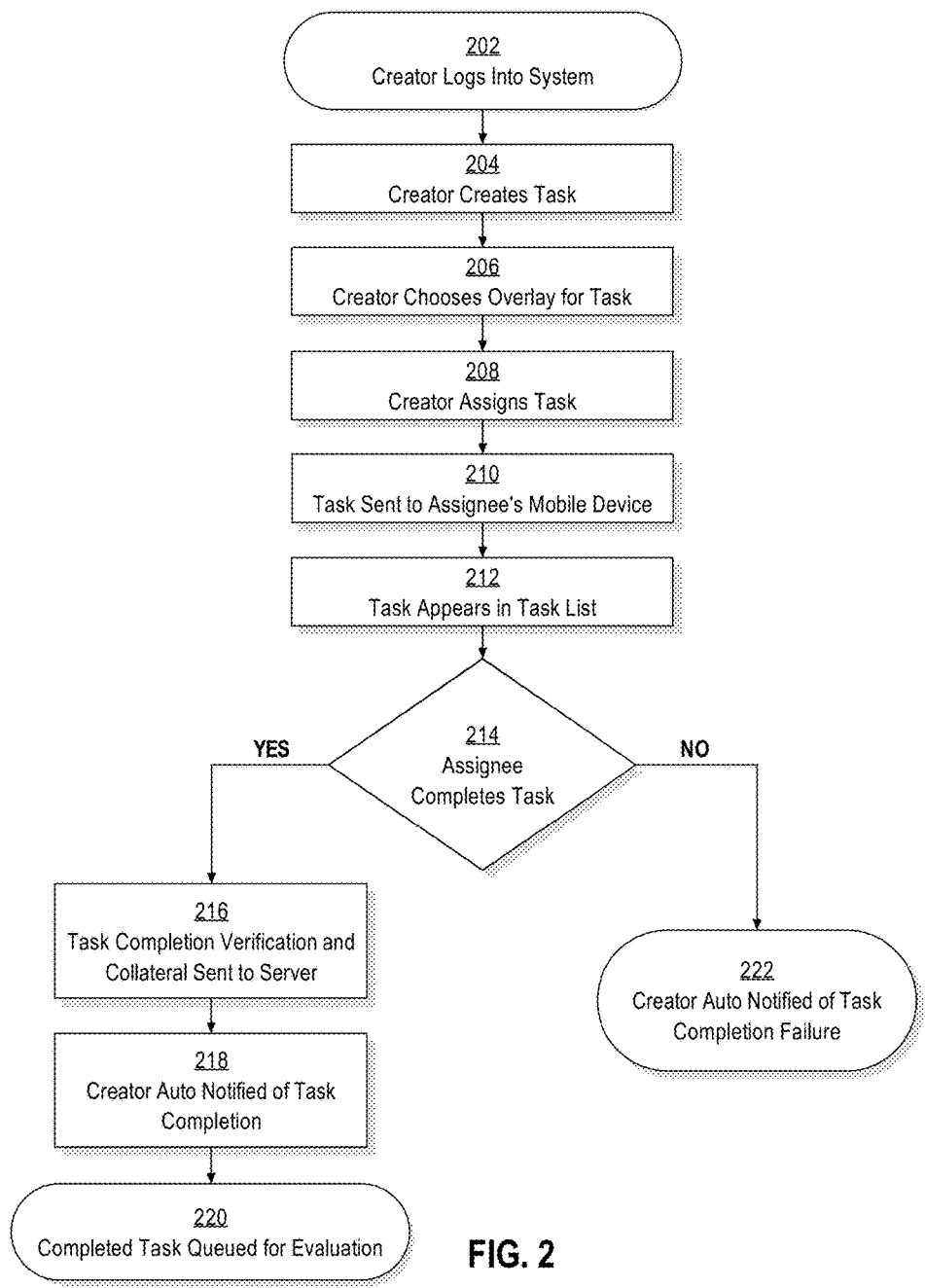
FIG. 2 illustrates a method or algorithm for assigning and completing media tasks.

FIG. 2 illustrates a method or algorithm for assigning and completing media tasks. The operations illustrated in FIG. 2, and in all other flow diagrams or method diagrams herein, may be implemented using computer programming to control the operation of the hardware devices that are described herein as performing the steps of the drawing figure. Thus, FIG. 2 and all other flow diagrams or method diagrams herein, in combination with the text herein, are intended to disclose algorithms or specifications that can be used as a basis to write computer programs to control the specified hardware elements to implement the features and functions that are described, in combination with the accumulated skill and knowledge of a person of skill in the field. Various embodiments may be implemented using Objective-C, C++, JAVA, and other programming languages or environments.

At step 202, a task creator logs into the system. For example, an employer may input a user name and password into managing computing device 130. Server computer 110 may verify the input credentials of the employer and cause managing computing device 130 to display a user interface for task creation.

At step 204, a task creator creates a task. For example, the employer may select an option on the user interface to create a new task. A task creation interface may be presented to the employer that accepts input for task related information, such as task name, description, tags, and due date. In some embodiments, the task creation interface also accepts input designating assignees for the task and overlays for the task.

Figure 3A:
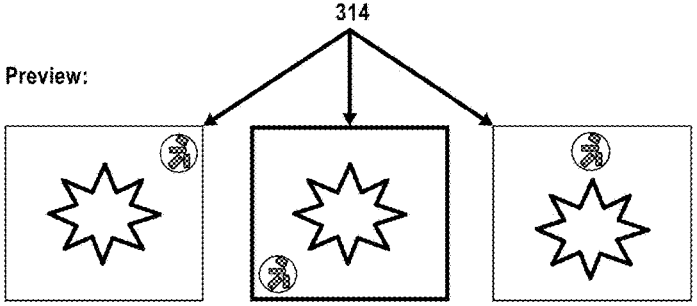
FIG. 3A depicts an example task creation interface with an image overlay that may be displayed by computer on a computer display device.

FIG. 3A depicts an example task creation interface with an image overlay. Task creation interface 300 contains task name field 302, task description field 304, task tags field 306, task due date field 308, task assignee field 310, task overlay field 312, and task previews 314. Task name field 302 may comprise an editable text box that allows a task creator to input a name for the task. Task description field 304 may comprise an editable text box that allows a task creator to input a description for the task. Between task name field 302 and task description field 304, a task creator may be able to give a task assignee all the information needed to complete the task.

Task tags field 306 may comprise an editable text box that allows a task creator to input tags for the task. A tag may comprise a word or phrase that identifies or describes the task. For example, selected tags in FIG. 3A include "photo," "task," and "demo." Task tags may later be used to locate specific tasks or to track specific metrics associated with tasks. For example, tasks with the tag "photo" may be the most common while tasks with the tag "demo" may receive the highest average evaluations. These metrics may be stored in a database along with the related tags. In an embodiment, task tags field 306 creates delineated boxes each time a tag is entered. For example, task tags field 306 may be configured to create a new tag box each time a comma, semi-colon, or carriage return is used within the editable text box. Each tag box may include a means for removing the task, such as an "x" within the tag box.

Task due date field 308 may comprise an editable text box that allows a task creator to input a date for completion of the task. Task due date field 308 may also contain an expandable calendar that may be used to select a due date. The due date may be saved along with the task and used to create notifications to the assignees when the due date for the task is nearing. Additionally, server computer 110 may be configured to mark a task as 'failed' or 'incomplete' if it does not receive an indication that the task has been completed by the due date.

Task assignee field 310 may comprise an editable text box that allows a task creator to assign the task to one or more users. Task assignee field 310 may include a drop down feature that allows a task creator to choose assignees based on stored possible assignee data. For example, an employer may be able to choose from a list of employees. Additionally, task assignee field 310 may contain an autocomplete feature which searches a database of possible assignees when the task creator begins typing into task assignee field 310 and offers suggestions for assignees based on the first few typed letters.

Task overlay field 312 may comprise a drop down menu that allows a task creator to select an overlay for the task. An overlay may be any type of media intended to accompany the media of the task. For example, an overlay may be an image such as a logo designed to accompany an image or video, a video clip, such as an advertisement designed to be played over a portion of a screen, an audio file designed to be played in the background of a video or audio clip, one or more captions designed to accompany an image or video, a screen filter or border, or any other type of media overlay. Task overlay field may be configured to alter task creation interface 300 depending on the type of overlay chosen. For example, upon receiving a selection of 'image', task creation interface 300 may be altered to display an option to upload an image along with one or more image based previews. The "Upload Image" feature may allow a task creator to select an image stored on the creator's computing device to use as the overlay.

Additionally, images may be saved in server database 120. For example, a company logo may be used frequently for image tasks. Thus, a task creator may wish to store the company logo in server database 120 for easy access in creating multiple tasks. In an embodiment, an option exists in the drop down menu of task overlay field 312 for 'stored image.' Receiving a selection of 'stored image' may cause task creation interface 300 to replace the "Upload Image" feature with a second drop down menu that contains names of stored images. Alternatively or additionally, task creation interface 300 may display thumbnails of stored images or other methods of selecting a stored image.

Task previews 314 may comprise one or more previews of the task media with the overlay designated in task overlay field 312. For example, in FIG. 3A task previews 314 include image boxes containing a logo in different locations. A task creator may select one of task previews 314 to cause the overlay for that task to appear in that location. For example, in FIG. 3A the selection of the middle option may cause the logo overlay to appear in the bottom left corner of the captured image or video. In some embodiments, task creation interface 300 contains an option for the task creator to specify one or more precise locations for the overlay. For example, an image preview may respond to one or more inputs, such as a carriage return or double click that causes it to expand. The location of the overlay may then become movable through one or more inputs such as a click and drag action or inputs through arrow keys of a keyboard.

Task creation interface 300 may also include additional entry boxes not shown in FIG. 3A. For instance, a requirements field may be configured to accept one or more requirements for the media from the task creator. For example, the task creator may specify a required amount of light for an image or a required volume for audio recordings. The requirements field may be a drop down menu from which a task creator may select one or more requirements, such as brightness, image clarity, objects within an image or video, minimum volume of audio, maximum volume of background audio, or any other requirements.

Task creation interface 300 may create new fields depending on the selected requirements. For example, if "minimum volume of audio" is selected, a separate field may be created to receive input specifying a threshold volume. In some embodiments, task creation interface 300 may contain editable text boxes for requirements. The editable text boxes may allow a task creator to specify additional requirements that are not covered in the description. Additional, a numeric scale may be provided to allow the task creator to specify a level of importance for each requirement.

FIG. 3B depicts an example task creation interface with a side by side photo with caption overlay. Task creation interface 300 contains task name field 302, task description field 304, task tags field 306, task due date field 308, task assignee field 310, task overlay field 312, and task previews 314. In FIG. 3B, task overlay field 312 contains a selection of "Side by Side Photo with Caption." In an embodiment, task creation interface 300 may allow a creator to designate a task as requiring a side by side photograph or video. Task creation interface 300 may also allow the creator to choose different overlays for each image or video in the side by side photograph or video. For example, in FIG. 3B, each screen of the side by side photograph contains a different caption. In additional examples, the screens may contain different images or videos. In even further embodiments, task creation interface may 300 allow the creator to choose a different type of overlay for each screen, such as an image for one screen and a caption for a second screen.

In some embodiments, task creation interface 300 may allow a task creator to choose multiple overlays for the same task. For example, an option may allow the creator to choose an image and a caption. In an alternate example, task creation interface 300 may include an "add overlay" button that allows a creator to add additional overlays to the task.

Additionally, task creation interface 300 may include an option for unlocking the position of the overlays. A task creator may select the unlock option in order to give the task assignees more freedom in positioning the overlays during the media capture.

Referring back to FIG. 2, at step 206 the creator chooses one or more overlays for the task. While FIG. 3A and FIG. 3B depicted the option to choose the overlay as part of the task creation, in some embodiments an overlay may be created and chosen as a separate step. Overlays may include images, video clips, strings, and audio clips. For example, a task may be created describing steps for baking a cake. The overlay may include numbered steps that change every ten seconds. A cake baker may then record footage of cake baking in ten second intervals to coincide with the changing overlay. As another example, a task may be created for generating an advertisement. An advertiser may be instructed to capture video of happy people spending time with their family. The overlay may be an audio recording describing side effects of a specific pharmaceutical.

At step 208, the creator assigns the task to one or more assignees. While FIGS. 3A and 3B depicted the option to choose the assignees as part of the task creation, in some embodiments the task may be assigned to individuals after the creation of the task. In some embodiments, assignees are part of a task group. Assigning tasks to a group may assign the task to each individual in the group. The group may complete the task when one of the members of the group successfully completes the task.

At step 210, the task is sent to the assignee. For example, a notification may be sent to mobile computing device 140 that identifies the new task using a list of employees and device registration information that is stored in server database 120.

At step 212, the task appears in a task list accessible by the mobile computing device. For example, the task list may take the form of a task application interface executing on mobile computing device 140. Alternatively, the task list may update on a webpage accessible through a browser on mobile computing device 140.

At step 214 the assignee completes the task using mobile computing device 140. Completing the task may comprise capturing one or more pictures, videos, audio clips, or combination thereof. The act of receiving tasks and completing tasks on a mobile computing device is described in more detail below. If the assignee fails to complete the task by the task due date, at step 222, server computer 110 may automatically notify the creator or one or more supervisors of the completion failure. For example, server computer 110 may send a message to managing computing device 130 when server computer 110 determines that the due date for the task has passed.

At step 216, the server is notified of the task completion. For example, mobile computing device 140 may send the captured media to server computer 110. Server computer 110 may verify that all of the requested media required to satisfy the task is present. If a piece of media is not present or does not conform to one or more task requirements, server computer 110 may send a message back to the task assignee indicating that the task has not been successfully completed. Server computer 110 may store the media received from mobile computing device 140 in server database 120 in conjunction with the task.

At step 218, the task creator is notified of the task completion. For example, server computer 110 may send a message to managing computing device 130 when server computer 110 determines that the task has been successfully completed. In some embodiments, notifying the task creator comprises changing a status of the task in a task viewing interface from "pending" to "completed." In other embodiments, a message is sent to an account of the task creator. When the task creator logs into the account, server computer 110 may notify the task creator or one or more supervisors that the task has been completed.

At step 220, the completed task is queued for evaluation. For example, an evaluation interface may be updated to contain the completed task. Task evaluation is discussed in more detail in sections below.

Mobile Computing Device

Figure 4:
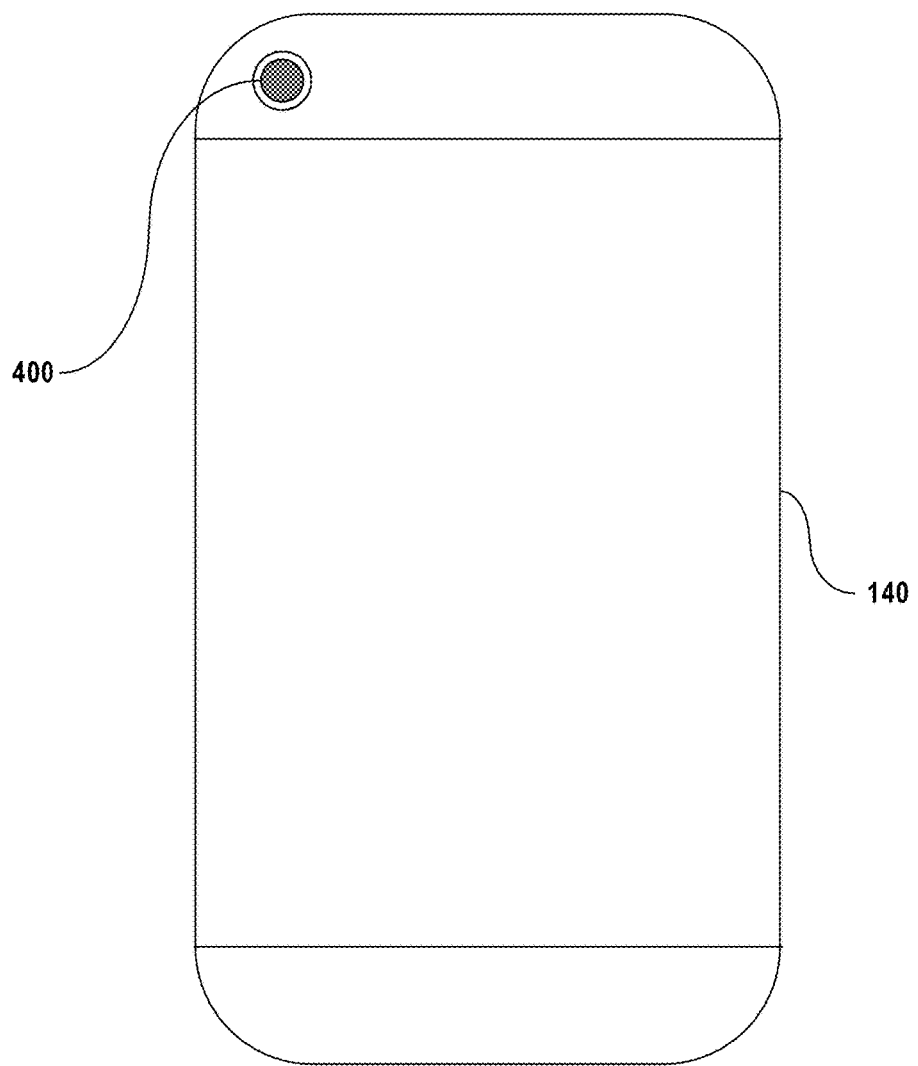
FIG. 4 depicts an example camera equipped mobile computing device.

FIG. 4 depicts an example camera equipped mobile computing device. Mobile computing device 140 contains camera 400. In the embodiment of FIG. 4 mobile computing device contains a rear facing camera. The camera includes one or more of a CMOS, CCD, or other active or passive image sensor capable of obtaining and storing digital images or motion video. "Mobile device," in this context may include a smartphone, tablet computer, laptop computer, or any other portable computer or mobile computer that can be programmed or configured to perform the functions that are described herein. Mobile computing device 140 may also contain a microphone for capturing audio recordings.

Figure 5:
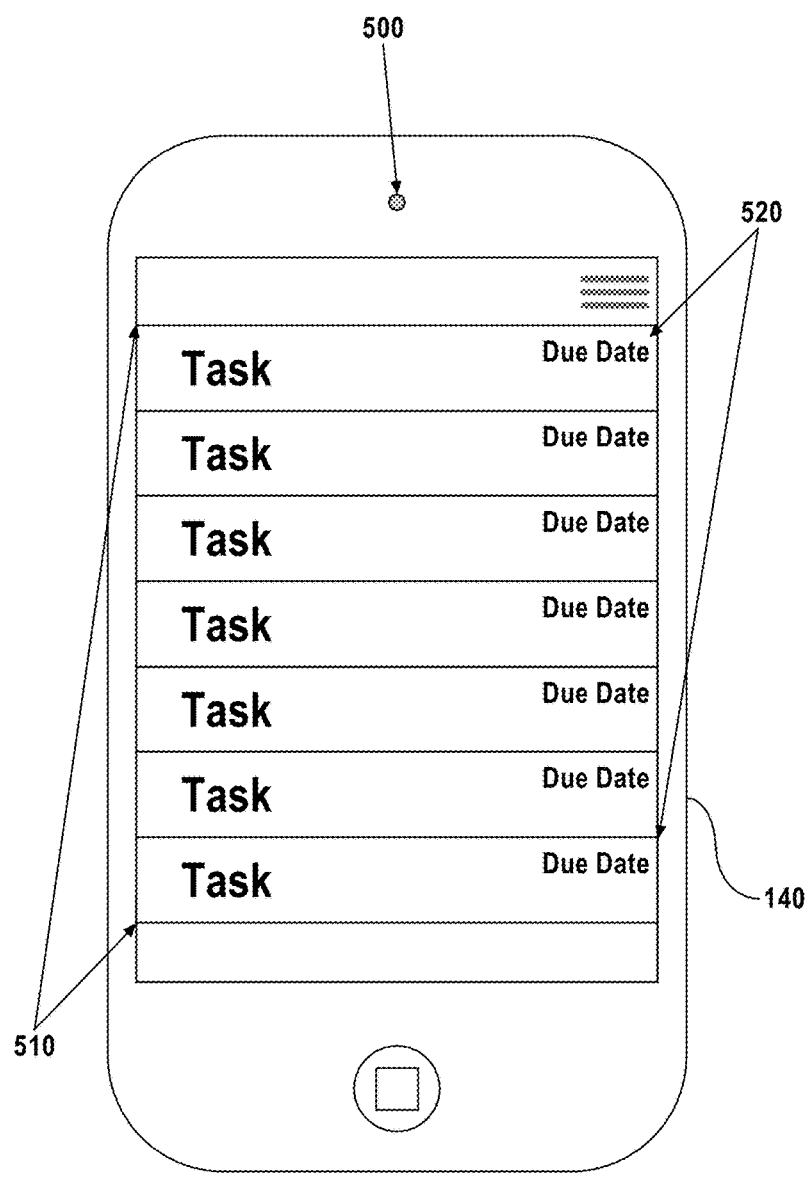
FIG. 5 depicts an example camera equipped mobile computing device displaying a task list via a software application.

FIG. 5 depicts an example camera equipped mobile computing device displaying a task list via a software application. In the embodiment of FIG. 5, mobile computing device 140 contains front facing camera 500. The front facing camera includes one or more of a CMOS, CCD, or other active or passive image sensor capable of obtaining and storing digital images or motion video. Tasks 510 are displayed on mobile computing device 140. Tasks 510 may be described using the name designated by the task creator at step 204 using task creation interface 300. Tasks 510 may additionally include due dates 520. Due dates 520 may indicate the date by which a task should be completed. Due dates 520 may be specified by the task creator at step 204 of FIG. 2 using task creation interface 300 of FIG. 3A or FIG. 3B. Tasks may be ordered on mobile computing device 140 by due date so that the top displayed task indicates the task with the earliest requested completion date.

Figure 6:
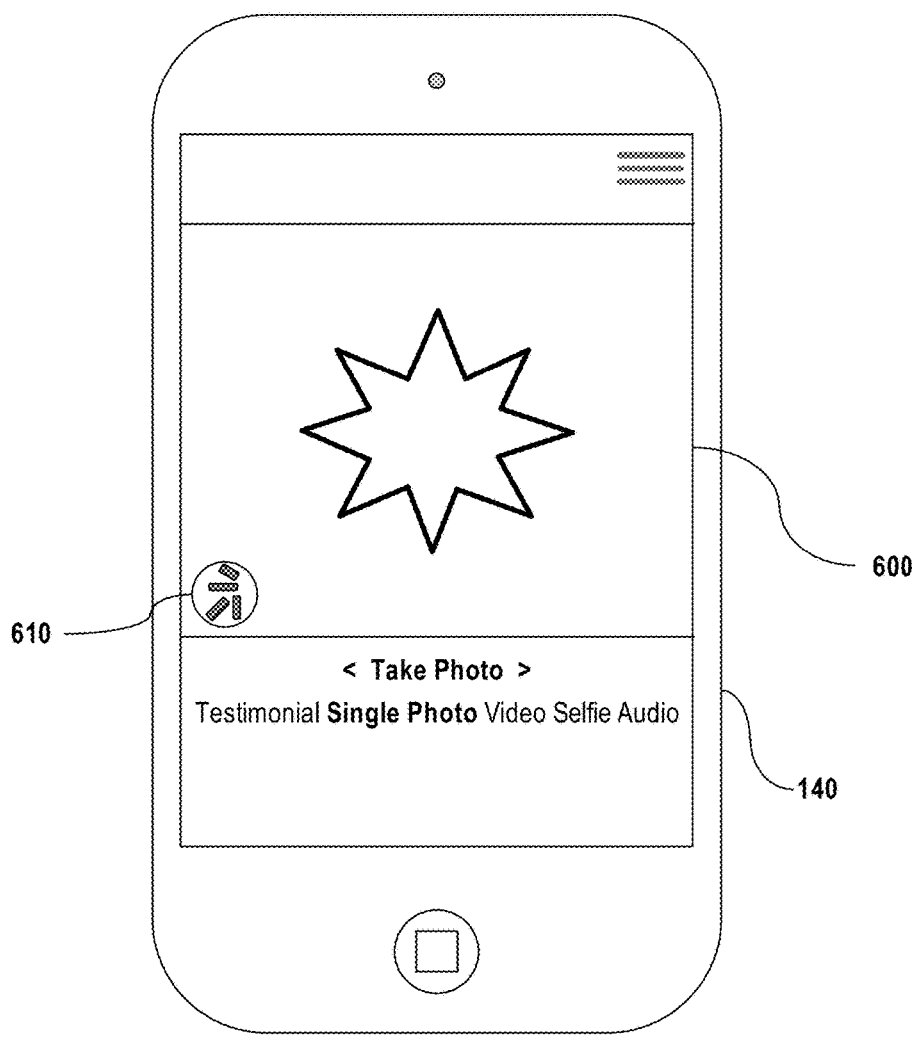
FIG. 6 depicts an example camera equipped mobile computing device displaying a photo and video capture interface with an image overlay.

FIG. 6 depicts an example camera equipped mobile computing device displaying a photo and video capture interface with an image overlay. Mobile computing device 140 contains display 600 for capturing images and video. Mobile computing device 140 acquires images and displays them on display 600. In an embodiment, images and video may be acquired using a front facing camera, a rear facing camera, or both a front facing camera and a rear facing camera. Various inputs may be used to start and stop the acquisition of images, audio, or video. For example, mobile computing device 140 may contain one or more camera buttons. In some embodiments, software used for the capture of digital image accepts user input through a touch screen of mobile device 140 for starting and stopping the acquisition of media.

Display 600 contains overlay 610. While overlay 610 is depicted as an image, overlay 610 may also comprise text, video recording, or audio recording. Overlay 610 may correspond to the overlay chosen by the task creator using task creation interface 300 of FIG. 3A or through step 206 of FIG. 2. Overlay 610 may be displayed on mobile computing device 140 while the task assignee prepares to capture image or video through display 600. For example, display 600 may show a preview of the final image that changes as the subject facing the camera changes. Overlay 610 may remain in the position selected through task creation interface 300 during the display of the preview. By displaying overlay 610 during the preview, mobile computing device 140 allows the task assignee to line up the media capture so that the overlay does not interfere with the captured media. In an embodiment, if the positioning of the overlay is unlocked, display 600 may be configured to accept input selecting the overlay and moving it around display 600.

Figure 7:
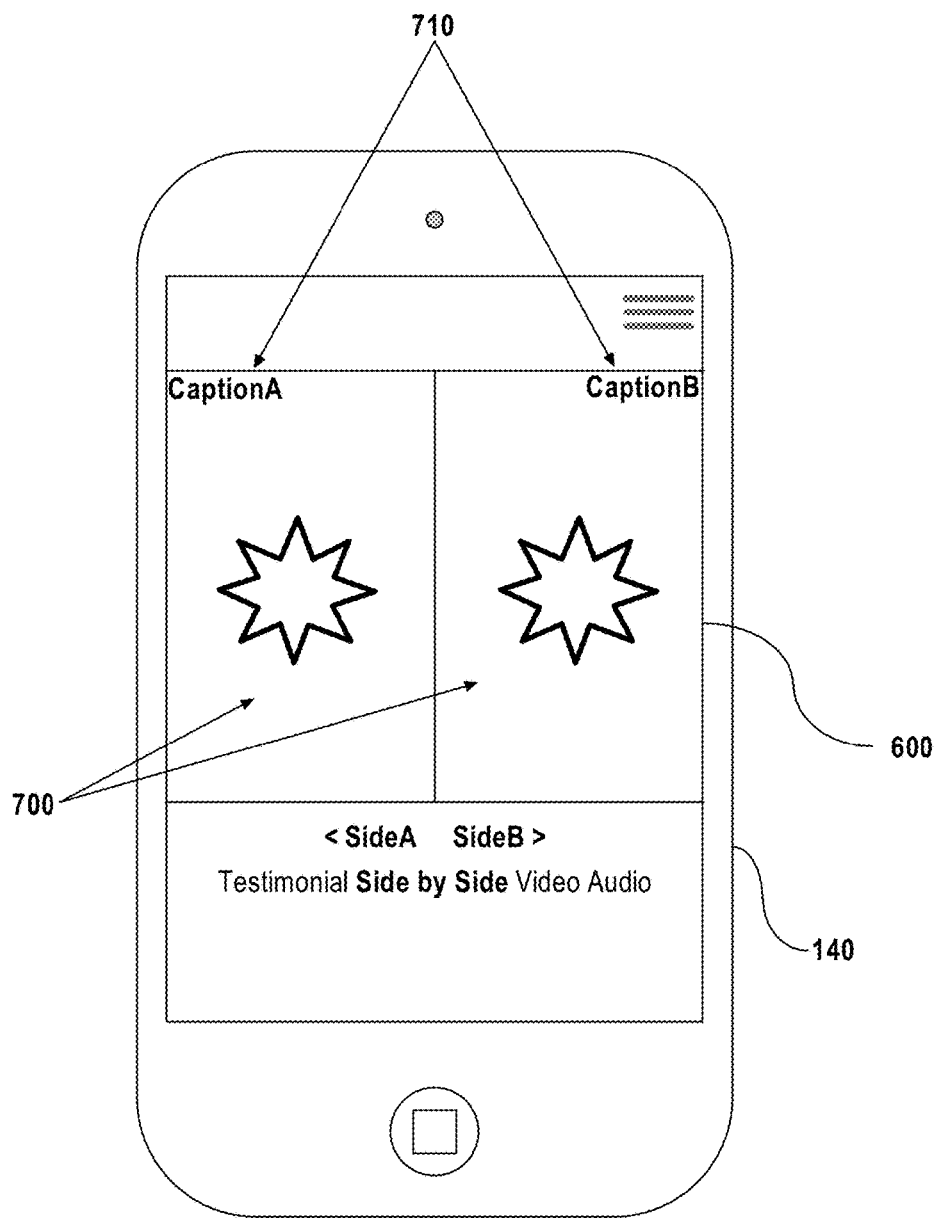
FIG. 7 depicts an example camera equipped mobile computing device displaying a side by side photo and video interface with a caption overlay.

FIG. 7 depicts an example camera equipped mobile computing device displaying a side by side photo and video interface with a caption overlay. Mobile computing device 140 contains display 600 for capturing images and video. In an embodiment, images and video may be acquired using a front facing camera, a rear facing camera, or both a front facing camera and a rear facing camera. In the embodiment depicted in FIG. 7, display 600 is split into side-by-side capture interface 700. Interface 700 may contain an image preview for both sides of interface 700. Interface 700 may be configured to allow a task assignee to capture image or video separately for either side of interface 700. For example, a task assignee may capture an image for the right half of interface 700 by tapping a touch screen on the right side of interface 700. The task assignee may capture an image for the left side of interface 700 at a later point by tapping the touch screen on the left side of interface 700.

In an embodiment, the first captured image through interface 700 remains on interface 700 while the task assignee previews the image capture for a second image. By displaying the first captured image during the image preview for the second image, mobile computing device 140 allows the task assignee to line up the media capture of the second image to coincide with the first. In additional embodiments, a task assignee may capture multiple images for a first side of interface 700. Interface 700 may be configured to allow the task assignee to scroll through the captured images for the first side of interface 700 during the preview for the second image capture, such as by using a swiping motion on the touch screen. Interface 700 may be further configured to accept input moving a captured image from one side of interface 700 to the other.

In embodiments, interface 700 may be configured to allow a task assignee to capture one or more images or video for a first half of interface 700. Mobile computing device 140 may be configured to send the one or more images or videos for the first half of interface 700 to a second mobile computing device, such as a device of a second task assignee. The second mobile computing device may display the one or more images or videos on the first half of interface 700 while an image capture preview is displayed on the second half of interface 700.

Interface 700 may include overlays 710. Overlays 710 may correspond to the overlays chosen by the task creator using task creation interface 300 of FIG. 3B or through step 206 of FIG. 2. In an embodiment, overlays 710 are different overlays. For example, in FIG. 7 the first overlay of overlays 710 reads "CaptionA" while the second overlay reads "CaptionB." In additional embodiments, overlays 710 are different types of overlays. For example, a first overlay may be a caption while a second overlay may be an image. In an embodiment, moving an image from one side of the interface 700 to the other side does not affect the locations of overlays 710. In another embodiment, an overlay may be moved along with the images. For example, if the task creator unlocked the positions for the overlays, interface 700 may accept input moving a captured image and overlay from one side of interface 700 to the other.

Media Authorization

Figure 8:
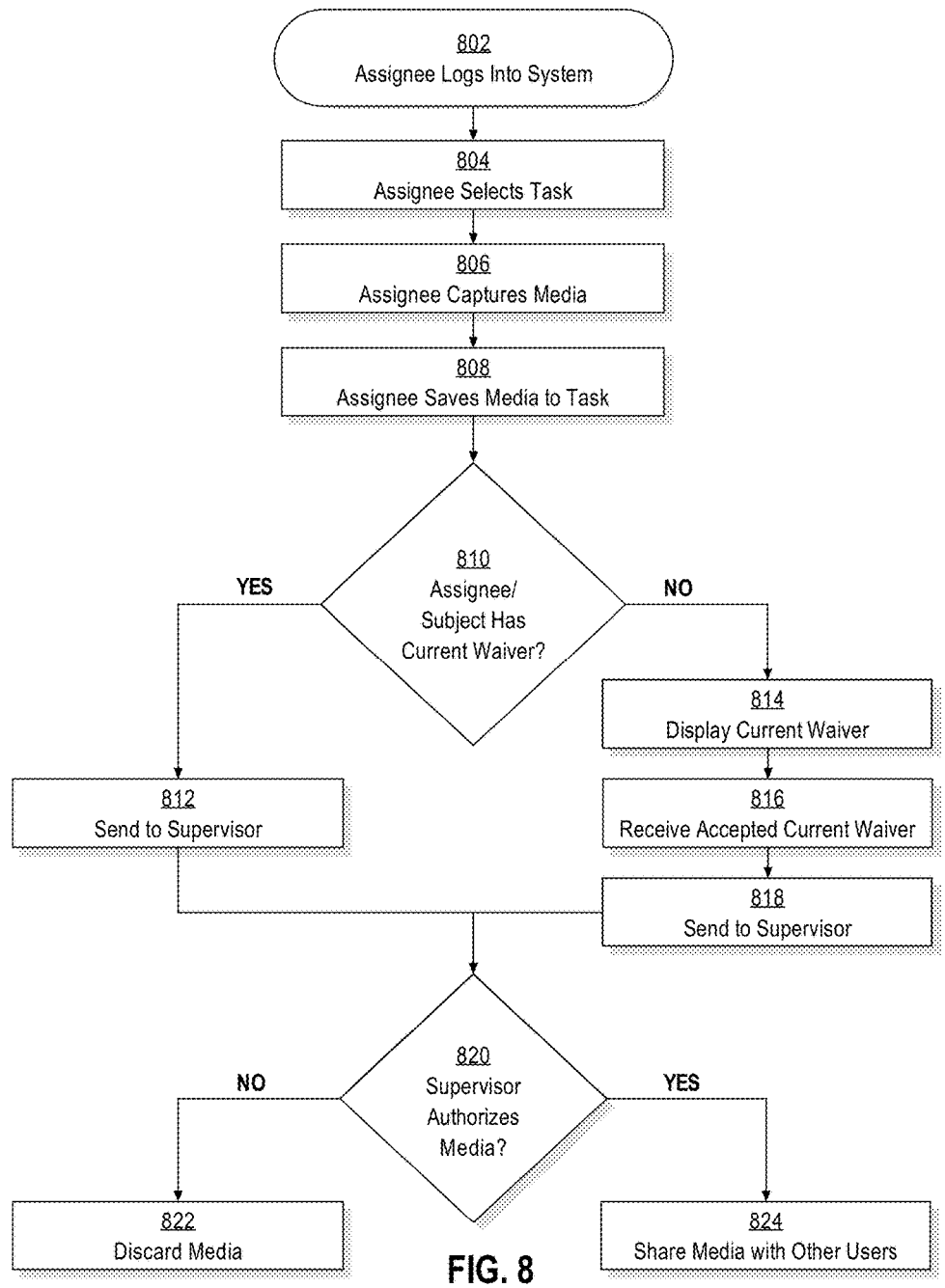
FIG. 8 illustrates a method or algorithm for authorizing captured media for distribution.

In some embodiments, the task server does not consider a task completed until the task server determines that it is authorized to distribute the captured media. FIG. 8 illustrates a method for authorizing captured media for distribution.

At step 802, the assignee logs into the system. The assignee may use software executing on mobile computing device 140 to log into the task system. For example, media task software may request a user name and password to log into the system. In some embodiments, the software executing on mobile computing device 140 recognizes mobile computing device 140 when it initializes and automatically logs into the system.

At step 804, the assignee selects a task to complete. For example, mobile computing device 140 may display the task list as shown in FIG. 5. The assignee may select a task from the task list to complete.

At step 806, the assignee captures media for the task. For example, the assignee may use the capture displays shown in FIG. 6 and FIG. 7 to capture images or video. Additionally, the assignee may use mobile computing device 140 to capture an audio recording through a microphone of mobile computing device 140.

At step 809, the assignee saves the media for the task. For example, the assignee may select a 'save' option after capturing the media. Additionally, the assignee may select a 'submit' option to submit the media in order to complete the task.

At step 810, the system determines whether the assignee or one or more subjects of the media have current valid waivers. For example, server computer 110 may search a waiver data repository stored in server database 120 for waiver information relating to the assignee. The waiver data repository may include unique identifiers for each assignee and subject, data identifying the most recent signed waiver, and data identifying the end date for the waiver. Additionally, current unsigned waivers may be generated for individuals without current waivers in the waiver data repository using a waiver template stored in the waiver data repository. Server computer 110 may use the unique identifier of the assignee to determine if a current valid waiver exists for the assignee.

In an embodiment, upon receiving a request to submit the media, mobile computing device 140 may request the identification of one or more subjects of the media. The assignee may use mobile computing device 140 to identify the one or more subjects of the media. For example, if the subject of the photograph was a snow plow that is owned by the company "Mr. Plow," the assignee may enter "Mr. Plow" as the subject of the photograph. In the advertisement example discussed above, the assignee may identify subjects of the video by name. Mobile computing device 140 may display a drop-down menu from which the assignee may select the one or more subjects from a list of subjects stored in the waiver data repository. Mobile computing device 140 may also display an editable text box in which the assignee input identifiers of the one or more subjects. In an embodiment, the editable text box may contain an autocomplete feature which searches the waiver data repository for possible subjects when the assignee begins typing into the editable text box and offers suggestions for subjects based on the first few typed letters. Once the one or more subjects have been selected, server computer 110 may determine whether the one or more subjects have a current valid waiver by querying the waiver data repository in server database 120.

Server computer 110 may be configured to create a new entry in the waiver data repository if waiver information for the one or more subjects is not found in the waiver data repository. The new entry may note that the subjects lack a current waiver. Server computer 110 may then generate waivers for the one or more subjects using the subject identifications and the current waiver template.

Figure 9:
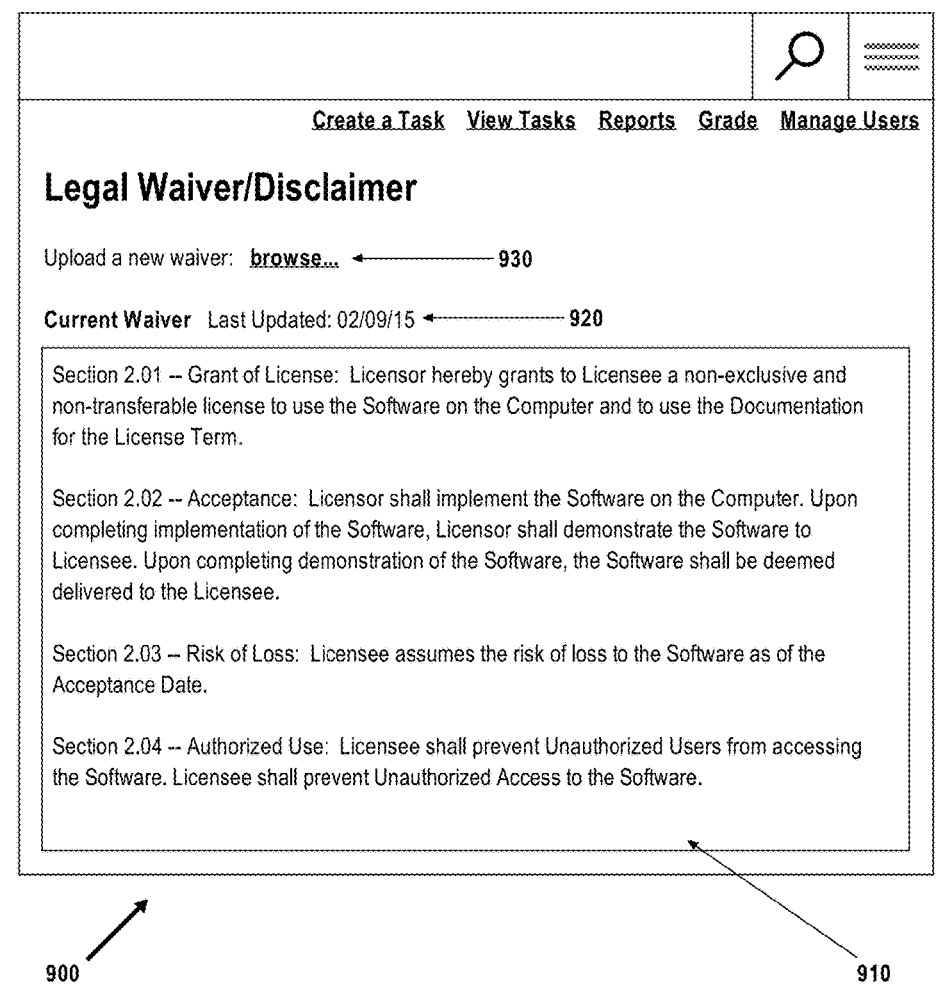

Current waivers and waiver templates may be viewed, edited, and managed on managing computer 130. FIG. 9 depicts an example waiver interface. Waiver interface 900 includes waiver text box 910, waiver information 920, and waiver addition tool 930. In some embodiments, waiver text box 910 is an editable text box. In other embodiments, waiver text box 910 is configured to only display a current waiver without receiving edits. Waiver information 920 may include information about the displayed waiver, such as whether the waiver is current, when the waiver was last updated, identifiers of signees to the currently displayed waiver, and any other waiver related information. Waiver addition tools 930 may comprise one or more tools for creating a waiver, uploading an existing waiver, or selecting a different waiver to view. In some embodiments, waiver additional tools 930 include the option of making the currently displayed waiver the current waiver for future subjects and task assignees. In other embodiments, waiver addition tools 930 include the option to assign the waiver to one or more specific entities. For example, a waiver generated through negotiations with a specific company may be assigned to only that company for future media captures.

Referring back to FIG. 8, if server computer 110 determines that the assignee, the subject, or both the assignee and subject have current waivers, the method moves to step 812. If the server computer 110 determines that a current valid waiver is missing for either the assignee, the subject, or both the assignee and subject, then the method moves to step 814. At step 814, a current waiver is displayed. For example, server computer 110 may send a current waiver to mobile computing device 140. Mobile computing device 140 may display the current waiver.

Figure 10:
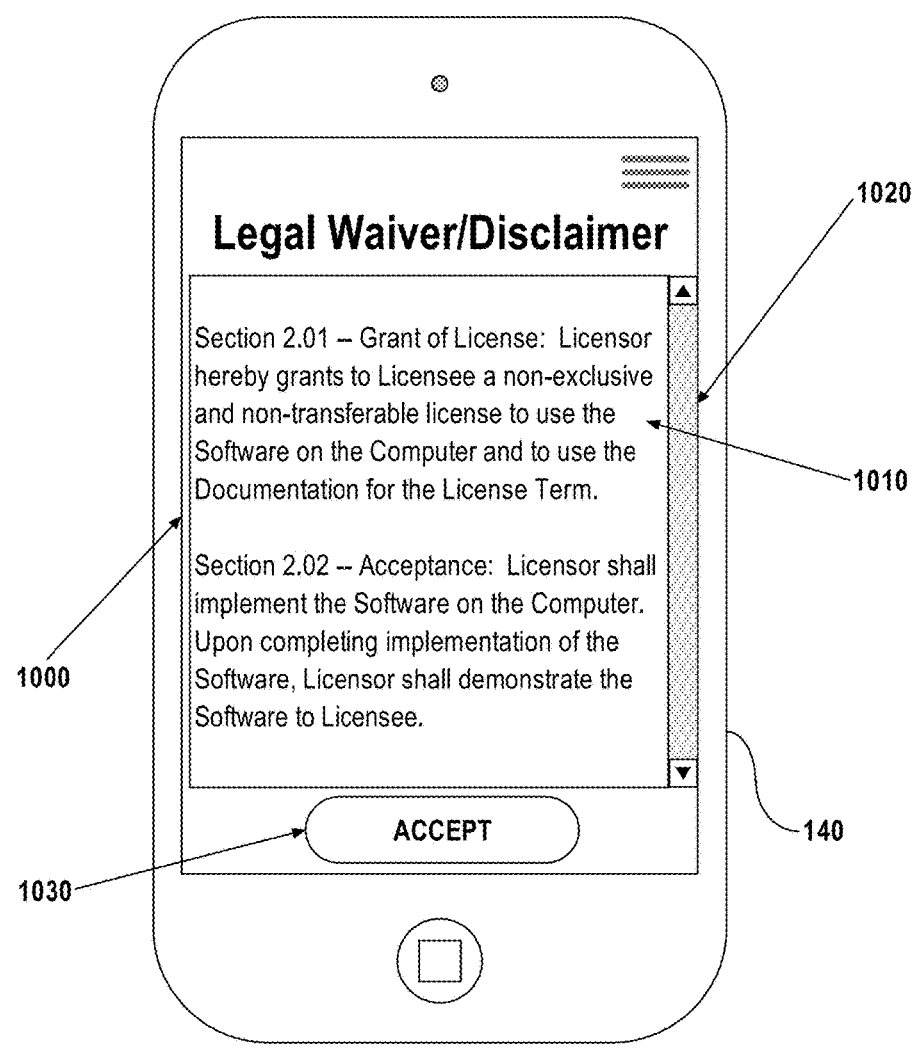
FIG. 10 depicts an example camera equipped mobile computing device displaying a waiver via a software application.

FIG. 10 depicts an example camera equipped mobile computing device displaying a waiver via a software application. In the embodiment of FIG. 10, mobile computing device 140 contains waiver interface 1000. Waiver interface 1000 may include waiver text 1010, waiver scroll 1020, and waiver acceptance 1030. In an embodiment, waiver scroll 1020 may be used to scroll through waiver text 1010. In some embodiments, waiver accept button does not accept input until all of waiver text 1010 has been scrolled through.

In some embodiments, waiver interface 1000 includes additional tools for identifying different signatories to the waiver and for accepting and storing signatures to the waiver. For example, in an embodiment if multiple waivers are identified by server computer 110, waiver interface 1000 may identify a current target user for the waiver. In another embodiment, a drop down menu may be incorporated into waiver interface 1000 which contains identifications of each subject or assignee. Waiver interface 1000 may accept input selecting a current viewer of the waiver before allowing the user to accept the waiver. In some embodiments, waiver interface may further comprise a signatory tool for situations where a signed waiver is requested. Waiver interface 1000 may accept user input through a touch screen interface that creates a signature for the waiver. Mobile computing device 140 may send the signature to server computer 110 with an indication that the waiver has been accepted by the target user.

In an embodiment, if server computer 110 determines that a waiver is needed for the one or more subjects, a waiver may be sent directly to the one or more subjects. For example, subjects identified in the waiver data repository may have an email address or phone number stored in the waiver data repository. Alternatively or additionally, the assignee may be prompted to input an email address, phone number, or other means of contact for the one or more subjects into an editable text field displayed on mobile computing device 140. Server computer 110 may then send waivers directly to the one or more subjects. For example, server computer 110 may generate an email with a uniform resource locator (URL). Selection of the URL may open a webpage hosted by server computer 110 with a waiver for the one or more subjects. When the one or more subjects accept the waiver, server computer 110 may update the waiver data repository to indicate that the waiver has been accepted by the one or more subjects.

Referring back to FIG. 8, at step 816 an accepted current waiver is received. For example, server computer 110 may receive one or more current waivers associated with assignees, media subjects, or both assignees and media subjects. Server computer 110 may store the one or more current waivers in the waiver data repository. If server computer 110 determines that another waiver is not needed, the method may proceed to step 818.

At steps 812 and 818, in an embodiment, the media is sent to a supervisor for authorization. In an embodiment, the supervisor may be the task creator. In some embodiments, the media is sent to multiple supervisors for authorization. In embodiments where multiple supervisors review the media for authorization, authorization may include acceptance by one of the supervisors, acceptance by a specified number of supervisors, or acceptance by all of the supervisors.

The authorization step may act as a precursor to the sharing of media between assignees. For example, if one of several assignees captures media relating to the task with a mobile computing device, the application executing on the mobile device may prohibit the assignee from sending the captured media to the other assignees until the captured media receives supervisory authorization. In the embodiment discussed above where one assignee captures the first half of a split-screen image, supervisory authorization may be required before the first half of the split-screen image is sent to the second assignee to complete the task.

In an embodiment, the authorization interface may also include an evaluation and grading interface as discussed below. In an alternate embodiment, the authorization step may be a precursor to releasing the media for evaluation and grading. For example, a supervisor may determine whether the captured media is appropriate to be viewed by one or more evaluators.

At step 820, the system determines if it has received authorization. For example, an authorization interface may include the option to authorize the media for distribution or to refuse to authorize the media for distribution.

At step 822, if the system does not receive authorization for the media or the system receives a refusal to authorize media, the media may be discarded. For example, server computer 110 may delete the remove the digital media file from server database 120. Server computer 110 may then notify the assignee that captured the media that the media was rejected. In an embodiment, server computer 110 does not notify the assignee of task completion until the media is accepted. In other embodiments, server computer 110 notifies the assignee that the task is no longer completed when media is rejected. The task may be reopened and reassigned to the assignee.

At step 824, if the system receives authorization for the media, other users may be provided access to the digital media. For example, mobile computing device 140 may allow the assignee to send the captured media to other assignees. Server computer 110 may also make the digital media accessible to others through a shared resource, such as server database 120. The captured media may appear in relation to the related task. For example, if multiple assignees are assigned to the same task, the captured media may appear when any of the assignees views or selects the task. In an embodiment, other assignees are notified of task completion when the final required piece of media is authorized. In addition, task assignees may receive a notification from server computer 110 any time a new piece of media is authorized with respect to the related task.

In an embodiment, server computer 110 may additionally determine if one or more requirements for the media are met before determining that the task has been completed. For example, if the task contained a requirement that the volume of audio was higher than a specified number of decibels, server computer 110 may treat the task as incomplete if the volume of the audio recording is lower than the specified number of decibels. If server computer 110 determines that the task fails one or more requirements, a message may be sent to the task assignee indicating failure to complete the task. In an embodiment, the message indicates which requirement was not satisfied by the captured media.

Evaluation and Grading

Figure 11:
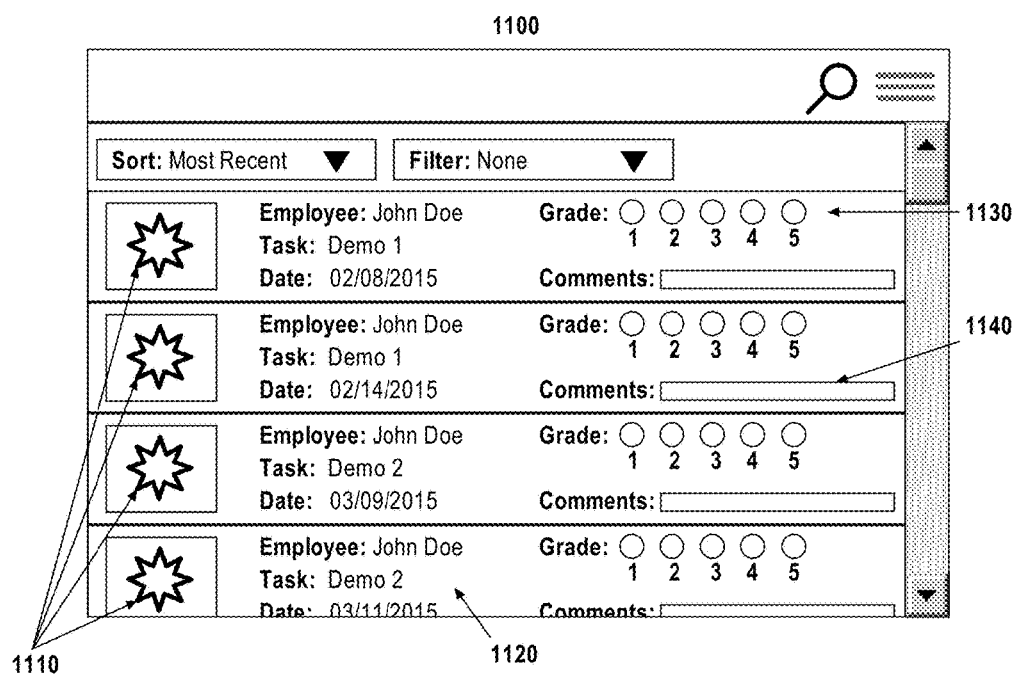
FIG. 11 depicts an example evaluation interface that may be displayed by computer on a computer display device.

In an embodiment, completed tasks are sent to evaluators for evaluation and grading. A task may be broken up into different pieces of captured media for evaluation. FIG. 11 depicts an example evaluation interface. Task evaluation interface 1100 contains task media 1110, task details 1120, grading interface 1130, and comments box 1140. Task media 1110 may comprise captured media such as images, video recordings, or audio recordings. Task media 1110 may appear on task interface 1100 in a prescribed order, such as organized by due date or task name. Task details 1120 may include details about the task media, such as an identification of the assignee that captured the media, the name of the related task, the due date for the task, the date of the media capture, and any requirements for the captured media. Grading interface 1130 may contain a numeric scale for evaluating the task media. Additionally, grading interface 1130 may contain additional numeric scales corresponding to any requirements for each task media. Comments box 1140 may be an editable text box configured to receive and store text input in relation to the one or more tasks.

In an embodiment, captured media for tasks are assigned to one or more evaluators for evaluation and grading. In other embodiments, the captured media is made available to one or more supervisors, any of which may evaluate and grade the captured media. In even further embodiments, the captured media is made available to non-supervisors, such as other assignees or other users of the task system, for evaluation and grading. For example, an automotive company may have hundreds of employees who may evaluate and grade new pictures of vehicles. Alternatively, grading and evaluation may be reserved for a subset of individuals, such as the members of the marketing department.

In embodiments, a threshold value may be specified that corresponds to a required minimum score for the captured media. For example, a minimum evaluation score of "4" may be set for important tasks. In an embodiment, if the task receives any evaluation less than 4, the task may be treated as failed by the server computer 110. Server computer 110 may notify the assignee of the task failure and request that the assignee recapture the media for the task. In another embodiment, evaluation scores are averaged amongst a plurality of evaluators. For example, in the advertising example the evaluators may comprise the marketing team. An average of the evaluations from the marketing team may be used to determine whether the captured media has received a high enough score to pass the specified threshold.

In embodiments with extra task requirements, the evaluations for the extra task requirements may be factored into an overall evaluation score. The additional task requirements may be weighted based on a level of importance specified by the task creator. In other embodiments, each task requirement receives a separate threshold value. If the evaluation for one of the task requirements is below the threshold value, the task may be treated as failed. The separate threshold value for each task requirement may be based on a level of importance specified by the task creator.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
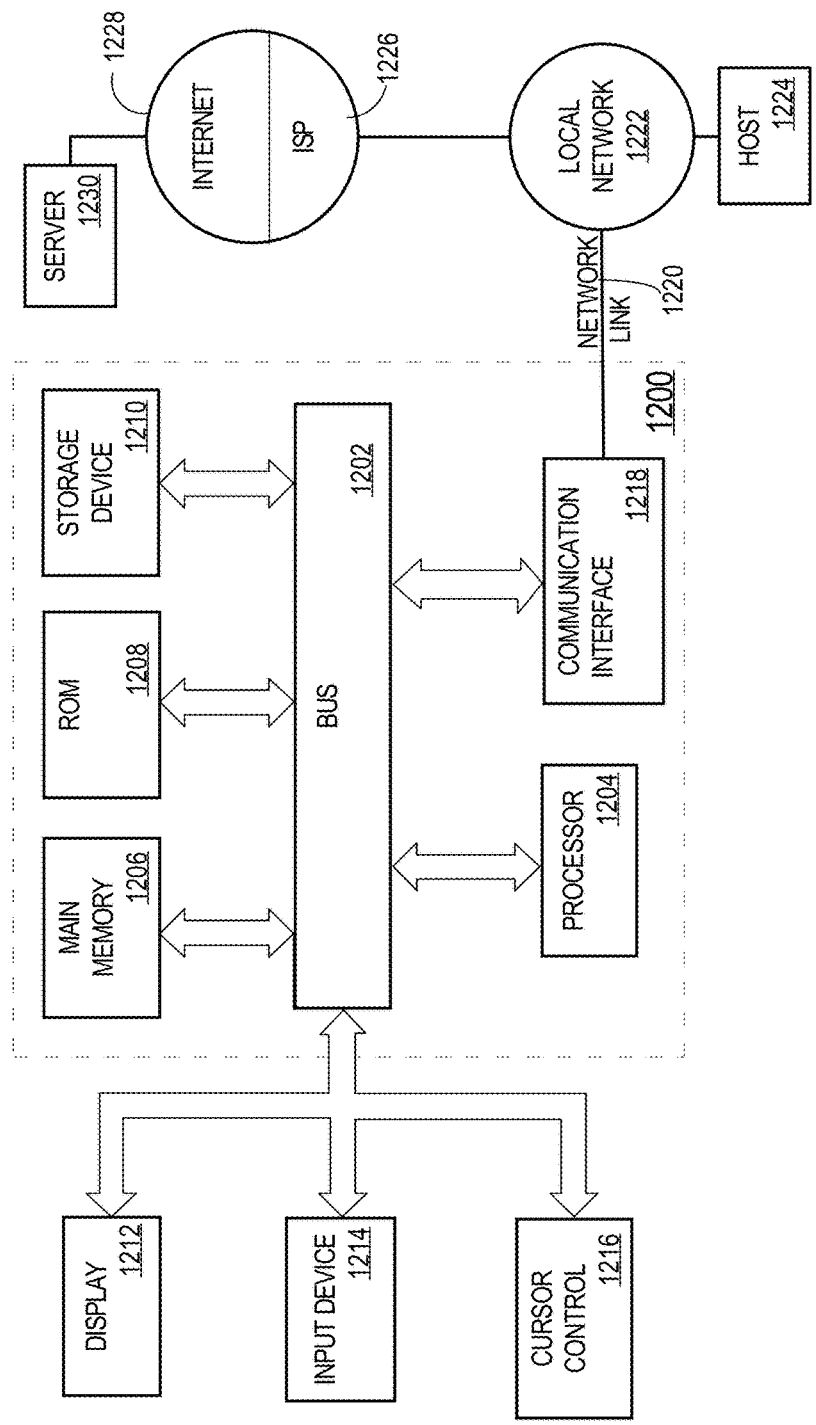
FIG. 12 is a block diagram that illustrates a computer system upon which embodiments may be implemented.

For example, FIG. 12 is a block diagram that illustrates a computer system 1200 upon which an embodiment may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or solid-state drive is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
using a server computer, creating a task object that identifies a digital media task and causing the task object to be stored in a data repository, wherein the digital media task identifies one or more users and one or more requests for digital media;
receiving, from a mobile computing device associated with a particular user of the one or more users, an item of digital media in response to the one or more requests for digital media;
determining that the server computer has authorization to provide one or more target computing devices with access to the item of digital media;
storing the item of digital media in the data repository with the task object;
displaying the one or more items of digital media to the one or more target computing devices in association with the task object;
displaying a graphical user interface with the item of digital media comprising one or more evaluation tools;
receiving, one or more evaluations of the item of digital media through the one or more evaluation tools;

determining that the one or more evaluations fall below a specified threshold value; and updating the task object with a request for a replacement item of digital media;

wherein the method is performed by one or more computing devices.

2. The method of claim 1, wherein determining that the server computer has authorization to provide the one or more target computing devices with access to the item of digital media comprises:

accessing a waiver data repository that stores a plurality of waivers, wherein each of the waivers is associated with a different entity among a plurality of entities;

determining that the particular user associated with the mobile computing device does not have a currently valid waiver;

retrieving a current waiver from the waiver data repository and sending the current waiver to the mobile computing device;

receiving input from the mobile computing device that the particular user has accepted the terms of the current waiver; and updating the waiver data repository by storing the current waiver in association with an identifier of the particular user.

3. The method of claim 1, wherein determining that the server computer has authorization to provide the one or more target computing devices with access to the item of digital media comprises:

receiving input from the particular user identifying one or more subjects of the item of digital media;

accessing a waiver data repository that stores a plurality of waivers, wherein each of the waivers is associated with a different entity among a plurality of entities;

determining that the waiver data repository does not have a current waiver for the one or more subjects;

retrieving a current waiver from the waiver data repository and sending the current waiver to the mobile computing device;

receiving input from the mobile computing device that the one or more subjects have accepted the terms of the current waiver; and updating the waiver data repository by storing the current waiver in association with an identifier of the one or more subjects.

4. The method of claim 1, wherein determining that the server computer has authorization to provide the one or more target computing devices with access to the item of digital media comprises:

displaying a graphical user interface to one or more supervisory computing devices comprising the item of digital media and one or more authorization tools; and receiving authorization input from the one or more supervisory computing, devices that authorizes the server computer to provide the one or more target computing devices with access to the item of digital media.

5. The method of claim 1, further comprising:

aggregating the one or more evaluations of the item of digital media into one or more total evaluations; and displaying the item of digital media with the one or more total evaluations.

6. The method of claim 1, wherein the task object includes a field specifying one or more requirements for the item of digital media; and wherein the one or more evaluation tools comprise options to indicate a level of compliance of the item of digital media with the one or more requirements.

7. The method of claim 1, wherein the task object includes a field specifying one or more requirements for the item of digital media; and wherein determining that the server computer has authorization to provide the one or more target computing devices with access to the item of digital media comprises determining that the item of digital media complies with the one or more requirements.

8. The method of claim 1, further comprising: displaying a graphical user interface with tools for creating a digital image overlay; and causing the digital image overlay to be stored with the task object in the data repository.

9. The method of claim 1, wherein the one or more users comprise a task team, and the method further comprising: upon storing the item of digital media in the data repository with the task object, sending one or more notifications to the task team that indicates completion of a request of the one or more requests for digital media.

10. A system comprising:

one or more processors;

a memory storing instructions which, when executed by the one or more processors, cause performance of:

creating a task object that identifies a digital media task and causing the task object to be stored in a data repository, wherein the digital media task identifies one or more users and one or more requests for digital media;

receiving, from a mobile computing device associated with a particular user of the one or more users, an item of digital media in response to the one or more requests for digital media;

determining that the system has authorization to provide one or more target computing devices with access to the item of digital media;

storing the item of digital media in the data repository with the task object;

displaying the one or more items of digital media to the one or more target computing devices in association with the task object;

displaying a graphical user interface with the item of digital media comprising one or more evaluation tools;

receiving, one or more evaluations of the item of digital media through the one or more evaluation tools;

determining that the one or more evaluations fall below a specified threshold value; and updating the task object with a request for a replacement item of digital media.

11. The system of claim 10, wherein determining that the system has authorization to provide the one or more target computing devices with access to the item of digital media comprises:

accessing a waiver data repository that stores a plurality of waivers, wherein each of the waivers is associated with a different entity among a plurality of entities;

determining that the particular user associated with the mobile computing device does not have a currently valid waiver;

retrieving a current waiver from the waiver data repository and sending the current waiver to the mobile computing device;

receiving input from the mobile computing device that the particular user has accepted the terms of the current waiver; and updating the waiver data repository by storing the current waiver in association with an identifier of the particular user.

12. The system of claim 10, wherein determining that the system has authorization to provide the one or more target computing devices with access to the item of digital media comprises:
- receiving input from the particular user identifying one or more subjects of the item of digital media;
- accessing a waiver data repository that stores a plurality of waivers, wherein each of the waivers is associated with a different entity among a plurality of entities;
- determining that the waiver data repository does not have a current waiver for the one or more subjects;
- retrieving a current waiver from the waiver data repository and sending the current waiver to the mobile computing device;
- receiving input from the mobile computing device that the one or more subjects have accepted the terms of the current waiver; and
- updating the waiver data repository by storing the current waiver in association with an identifier of the one or more subjects.

13. The system of claim 10, wherein determining that the system has authorization to provide the one or more target computing devices with access to the item of digital media comprises:
- displaying a graphical user interface to one or more supervisory computing devices comprising the item of digital media and one or more authorization totals; and
- receiving authorization input from the one or more supervisory computing devices that authorizes the system to provide the one or more target computing devices with access to the item of digital media.

14. The system of claim 10, wherein the instructions, when executed by the one or more processors further cause performance of:
- aggregating the one or more evaluations of the item of digital media into one or more total evaluations;
- displaying the item of digital media with the one or more total evaluations.

15. The system of claim 10, wherein the task object includes a field specifying one or more requirements for the item of digital media; and
- wherein the one or more evaluation tools comprise options to indicate a level of compliance of the item of digital media with the one or more requirements.

16. The system of claim 10, wherein the task object includes a field specifying one or more requirements for the item of digital media; and
- wherein determining that the system has authorization to provide the one or more target computing devices with access to the item of digital media comprises determining that the item of digital media complies with the one or more requirements.

17. The system of claim 10, further comprising:
- displaying a graphical user interface with tools for creating a digital image overlay; and
- causing the digital image overlay to be stored with the task object in the data repository.

18. The system of claim 10, wherein the one or more users comprise a task team, and wherein the instructions, when executed by the one or more processors further cause performance of:
- upon storing the item of digital media in the data repository with the task object, sending one or more notifications to the task team that indicates completion of a request of the one or more requests for digital media.

* * * * *